United States Patent
Liu

(10) Patent No.: US 10,949,626 B2
(45) Date of Patent: *Mar. 16, 2021

(54) GLOBAL SIMULTANEOUS INTERPRETATION MOBILE PHONE AND METHOD

(71) Applicant: WING TAK LEE SILICONE RUBBER TECHNOLOGY (SHENZHEN) CO., LTD, Guangdong (CN)

(72) Inventor: Tak Nam Liu, Guangdong (CN)

(73) Assignee: WING TAK LEE SILICONE RUBBER TECHNOLOGY (SHENZHEN) CO., LTD, Shenzhen (CN)

( * ) Notice: Subject to any disclaimer, the term of this patent is extended or adjusted under 35 U.S.C. 154(b) by 87 days.

This patent is subject to a terminal disclaimer.

(21) Appl. No.: 16/299,173

(22) Filed: Mar. 12, 2019

(65) Prior Publication Data

US 2020/0125645 A1  Apr. 23, 2020

(30) Foreign Application Priority Data

Oct. 17, 2018 (CN) .......................... 201811211344.1

(51) Int. Cl.
| G06F 40/58 | (2020.01) |
| G10L 15/00 | (2013.01) |
| G10L 15/22 | (2006.01) |
| G10L 15/30 | (2013.01) |
| H04M 3/42 | (2006.01) |
| H04M 1/60 | (2006.01) |

(52) U.S. Cl.
CPC ............. *G06F 40/58* (2020.01); *G10L 15/005* (2013.01); *G10L 15/22* (2013.01); *G10L 15/30* (2013.01); *H04M 1/6041* (2013.01); *H04M 3/42059* (2013.01); *H04M 2242/12* (2013.01)

(58) Field of Classification Search
CPC ....... G06F 40/58; G10L 15/005; G10L 15/22; G10L 15/30; H04M 1/6041; H04M 3/42059; H04M 2242/12
USPC ...................................................... 704/277
See application file for complete search history.

(56) References Cited

U.S. PATENT DOCUMENTS

| 2004/0093211 A1* | 5/2004 | Reynolds ................ G10L 15/30 704/235 |
| 2007/0179785 A1* | 8/2007 | Herry .................... G10L 15/005 704/259 |
| 2008/0200156 A1* | 8/2008 | Hicks .................. H04M 3/5116 455/415 |

(Continued)

*Primary Examiner* — Paras D Shah
*Assistant Examiner* — Nicole A Kotulak

(57) ABSTRACT

The present disclosure provides a global simultaneous interpretation method and production thereof, the method includes the following steps: receiving a calling request sent by a terminal by a smart phone, connecting the calling request, and establishing a calling connection; receiving a first voice information transmitted through the calling connection by the smart phone, and when the first voice information is identified and is determined as a non-specified language, translating the first voice information into a second voice information of a specified language; and playing the second voice information by using a speaker device by the smart phone.

7 Claims, 3 Drawing Sheets

(56) References Cited

U.S. PATENT DOCUMENTS

| | | | |
|---|---|---|---|
| 2008/0298559 A1* | 12/2008 | Nanjundaswamy | ......................... H04M 1/72572 379/88.16 |
| 2009/0006076 A1* | 1/2009 | Jindal | ..................... H04M 3/42 704/3 |
| 2012/0215521 A1* | 8/2012 | Sistrunk | .................. G06F 40/58 704/3 |
| 2014/0358516 A1* | 12/2014 | Lin | ......................... G06F 40/58 704/2 |
| 2015/0237298 A1* | 8/2015 | Garland | ............... H04H 20/423 348/466 |
| 2016/0080558 A1* | 3/2016 | Kim | .................. H04M 1/72522 455/414.1 |
| 2019/0189111 A1* | 6/2019 | Watanabe | ............... G10L 15/16 |

\* cited by examiner

GLOBAL SIMULTANEOUS INTERPRETATION MOBILE PHONE AND METHOD

CROSS REFERENCE TO RELATED APPLICATION

The present application claims priority to Chinese patent application No. 201811211344.1, entitled "global simultaneous interpretation mobile phone and method", filed on Oct. 17, 2018, the entire content of which is incorporated herein by reference.

TECHNICAL FIELD

The present application relates to the field of communication and translation technologies, and specifically, to a global simultaneous interpretation mobile phone and method.

BACKGROUND

Simultaneous interpretation is an interpretation manner in which an interpreter translates a speech of a speaker for audience uninterruptedly without interrupting the speaker. An electroacoustic system used for translation is dedicatedly disposed in a conference hall or a theater. Interpreters simultaneously translate a speech or lines into different languages, the translated content is transmitted through the electroacoustic system, and the audience may freely select and listen to content in a certain language.

Existing simultaneous interpretation is implemented based on professionals, leading to great costs and high limitations. Because an existing mobile phone cannot implement translation of conversations, and cannot reach a simultaneous interpretation requirement, a mobile phone capable of implementing simultaneous interpretation is necessary, which can affect user experience.

SUMMARY

Embodiments of the present application provide a global simultaneous interpretation mobile phone and method, so that accuracy of language translation can be improved, simultaneous interpretation can be implemented, and user experience can be improved.

According to a first embodiment, the present application provides a global simultaneous interpretation method. The method includes the following steps:
  receiving, by a smart phone, a calling request sent by a terminal, connecting the calling request, and establishing a calling connection;
  receiving, by the smart phone, a first voice information transmitted through the calling connection, and when the first voice information is identified and is determined as a non-specified language, translating the first voice information into a second voice information of a specified language; and
  playing, by the smart phone, the second voice information by using a speaker device.

Preferably, the calling connection is a 2G, 4G, or 5G calling connection.

Preferably, the process for identifying the first voice information and determining the first voice information as the non-specified language specifically includes:
  extracting a number of the terminal of the first voice information, determining a first nationality of the number, and if the first nationality does not belong to a nationality of the specified language, determining the first voice information as the non-specified language.

Preferably, the process of identifying the first voice information and determining the first voice information as the non-specified language specifically includes:
  generating an input matrix w by using the first voice information, using the input matrix w as input data, inputting the input data to a weight matrix p of a neural network model for computation to obtain a forward operation result, and determining, based on the forward operation result, whether the first voice information is the specified language.

According to a second embodiment, a smart phone is provided, which includes a processor, a communication unit, and a speaker device, wherein
  the communication unit is configured to receive a calling request sent by a terminal, connect the calling request, establish a calling connection, and receive first voice information transmitted through the calling connection; and
  the processor is configured to: when the first voice information is identified and is determined as a non-specified language, translate the first voice information into second voice information of a specified language, and control the speaker device to play the second voice information.

Preferably, the calling connection is a 2G, 4G, or 5G calling connection.

Preferably, the processor is specifically configured to extract a number of the terminal of the first voice information, determine a first nationality of the number, and if the first nationality does not belong to a nationality of the specified language, determine the first voice information as the non-specified language.

Preferably, the processor is specifically configured to generate an input matrix w by using the first voice information, use the input matrix w as input data, input the input data to a weight matrix p of a neural network model for computation to obtain a forward operation result, and determine, based on the forward operation result, whether the first voice information is the specified language.

According to a third embodiment, a computer readable storage medium is provided. The computer readable storage medium stores a program used for electronic data exchange, and the program enables a terminal to perform the method provided in the first embodiment.

Implementation of the embodiments of the present application has the following beneficial effects.

It can be learned that in the technical solutions provided in this application, when the calling request is received, the calling request is answered and the calling connection is established. After the first voice information is received based on the calling connection, when the first voice information is determined as the non-specified language, the first voice information is translated into the second voice information of the specified language, and the second voice information is played by using the speaker device. In this way, voice information can be played in real time during calling, thereby implementing a simultaneous interpretation function.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art may still derive other drawings from these accompanying drawings without creative efforts.

DESCRIPTION OF THE EMBODIMENTS

The following clearly and completely describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", "third", "fourth" and so on are intended to distinguish between different objects but do not indicate a particular order. In addition, terms "including" and "having", and any variants thereof intend to cover non-exclusive inclusion. For example, a process, method, system, product, or device including a series of steps or units is not limited to the listed steps or units, and optionally, may further include a step or unit that is not listed, or optionally, may further include other steps or units inherent to the process, method, product, or device.

When an "embodiment" is mentioned in this specification, it means that a particular feature, result, or characteristic described with reference to this embodiment may be included in at least one embodiment of the present application. The word in various locations in this specification does not necessarily mean a same embodiment, and is not an embodiment independent from other embodiments or a candidate embodiment of other embodiments. A person skilled in the art may explicitly and implicitly understand that the embodiment described in this specification may be combined with other embodiments.

Figure 1:
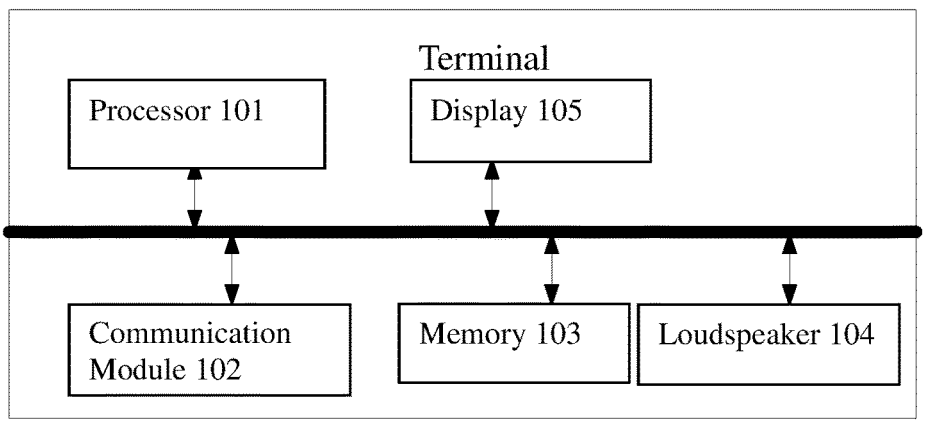
FIG. 1 is a schematic structural diagram of a terminal.

Referring to FIG. 1, FIG. 1 is a schematic structural diagram of a terminal. As shown in FIG. 1, the terminal includes a processor 101, a display 105, a communication module 102, a memory 103, and a loudspeaker 104.

The processor 101 may specifically include a multi-core processor.

Preferably, the processor 101 may further integrate a neural network processing chip. The neural network processing chip itself may include an internal memory for data storage.

Figure 2:
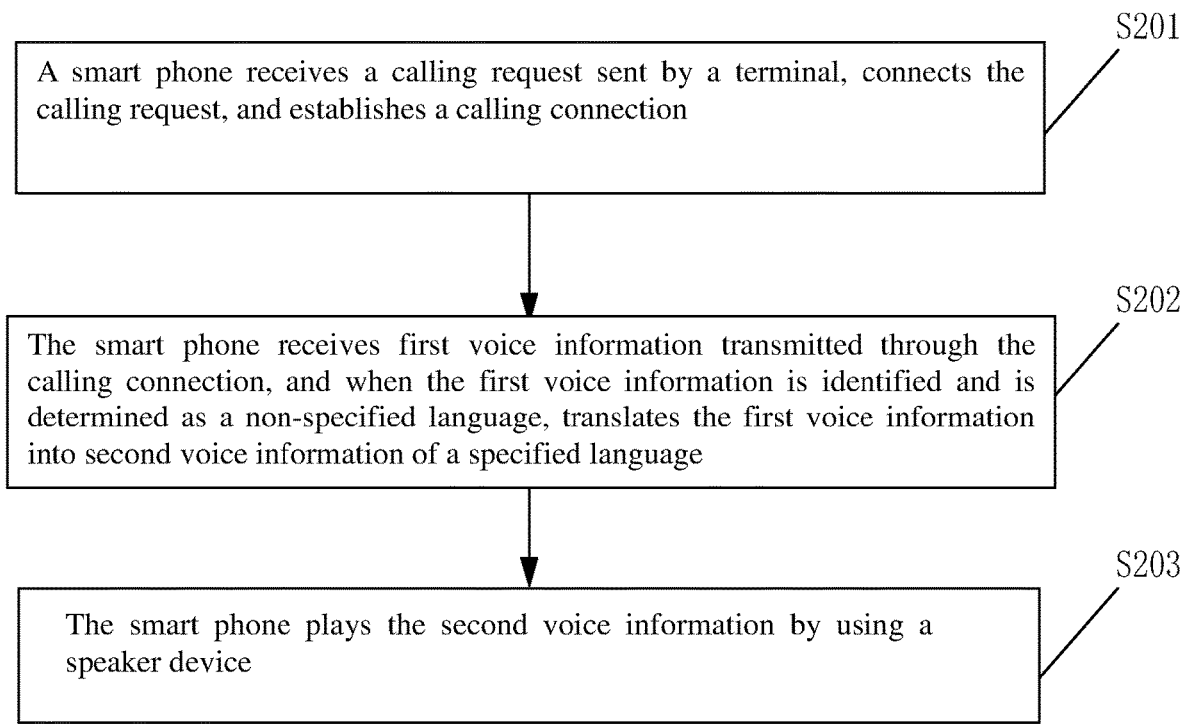
FIG. 2 is a schematic flowchart of a global simultaneous interpretation method.

Referring to FIG. 2, FIG. 2 provides a global simultaneous interpretation method. The method is performed by the terminal shown in FIG. 1. The terminal may be specifically a mobile phone. As shown in FIG. 2, the method includes the following steps:

Step S201: A smart phone receives a calling request sent by a terminal, connects the calling request, and establishes a calling connection.

The terminal may be an intelligent device such as a mobile phone, a tablet computer, or a PDA.

Preferably, the calling request may be specifically a 2G-based calling request, or may be a 4G-based calling request, that is, VOLTE, or certainly, may be a 5G based calling request or a short range calling request, for example, an interphone.

Step S202: The smart phone receives first voice information transmitted through the calling connection, and when the first voice information is identified and is determined as a non-specified language, translates the first voice information into second voice information of a specified language.

There may be a plurality of methods of identifying the first voice information and determining the first voice information as the non-specified language. For example, in an optional implementation solution, obtaining a first location of the terminal of the first voice information, determining a nationality of the first location, and if the nationality does not belong to a nationality of the specified language, determining the first voice information as the non-specified language.

For example, the first location of the terminal of the first voice information is the United States of America. If the specified language is Chinese, the first language information is determined as the non-specified language. By using the method, it can be approximately distinguished whether a language is a non-specified language, and because a Chinese may be on a business trip in the United States of America, and may call a person in China, there may be some errors in a geographical location.

For another example, a number of the terminal of the first voice information is extracted, a first nationality of the number is determined, and if the first nationality does not belong to a nationality of the specified language, the first voice information is determined as the non-specified language.

For example, the number of the terminal is 001. If the specified language is Chinese, because 001 represents the United States of America, it is determined that the first voice information is the non-specified language. For some people travelling in the United States of America, although they call people in China when they travel in the United States of America, they still use mobile phones with Chinese phone numbers. Therefore, when they make the calls, if they use Chinese phone numbers, although they are using an international roaming service, a country code is still a country code of China, that is, 086. If the country code is 001, they are using American phone numbers, and the first voice information is the non-specified language.

For another example, a classifier may be used for implementation. For example, a machine learning model is used to identify whether the first voice information is the specified language. This manner is the most accurate, but has a relatively large computation amount.

Preferably, the method of translating the first voice information into the second voice information of the specified language may be implemented by using a common method, for example, a translation robot of iFLYtek, and certainly, may be implemented in another manner, for example, by using translation software such as Google Translate or Baidu Translate.

Step S203: The smart phone plays the second voice information by using a speaker device.

In the technical solutions provided in this application, when the calling request is received, the calling request is answered and the calling connection is established. After the first voice information is received based on the calling connection, when the first voice information is determined as the non-specified language, the first voice information is translated into the second voice information of the specified language, and the second voice information is played by using the speaker device. In this way, voice information can be played in real time during calling, thereby implementing a simultaneous interpretation function.

It should be noted that the method of determining, by using the classifier, whether the first voice information is the specified language may be: if the classifier is a neural network model, generating an input matrix w by using the first voice information, using the input matrix w as input data, inputting the input data to a weight matrix p of the neural network model for computation to obtain a forward operation result, and determining, based on the forward operation result, whether the first voice information is the specified language.

The method of generating an input matrix w by using the first voice information may be implemented by using a method of generating an input matrix in an existing classification and identification algorithm. For example, a waveform graph (for example, the waveform graph may be directly collected by using recording software) of the first voice information is collected, multiple values are sampled in the waveform graph, and the multiple values are arranged in sequence to form the input matrix. Certainly, there may be another manner, and this application is not limited to the foregoing manner of generating the input matrix.

A method of determining, based on the forward operation result, whether the first voice information is the specified language may specifically include:

if the forward operation result is a result matrix, determining x locations corresponding to x elements greater than a specified threshold in the result matrix, and if more than x/2 locations in the x locations correspond to the specified language, determining that the forward operation result is the specified language, or otherwise, determining that the forward operation result is the non-specified language.

Certainly, to accelerate computation, if the neural network model includes a matrix multiplication operation between the input matrix w and the weight matrix p, w1 rows of elements are extracted from the input matrix w to form an input matrix w1, the input matrix w1 is split into $\alpha$ column matrices based on a quantity of columns, and the weight matrix p is split into $\alpha$ row matrices based on a quantity of rows. The $\alpha$ column matrices and the $\alpha$ row matrices are respectively sent to $\alpha$ computation units for an inner product operation to obtain $\alpha$ matrix sub-results, values of locations corresponding to the $\alpha$ matrix sub-results are added to obtain an output sub-result, and x1 locations corresponding to x1 elements greater than a specified threshold in the output sub-result are determined. If more than 0.5X*w0/w1 locations in the x1 locations correspond to the specified language, then the forward operation result is determined as the specified language, or otherwise, the forward operation result is determined as the non-specified language.

A based principle thereof is: For identification of a language category, is different from that of translation, and language types can be distinguished only when some data is determined. For example, for a Chinese sentence "you are so beautiful (ni zhen piao hang)", for a person knowing Chinese, it can be identified, based on information such as "beautiful (piao hang)" or "you (ni)", that the sentence is in Chinese. Therefore, in the technical solutions of this application, elements of some rows of the input matrix w are extracted, that is, some information is extracted to perform computation for identification, thereby reducing a computation amount. To increase a computation speed, the input matrix w1 and the weight matrix p are respectively split into $\alpha$ column matrices and $\alpha$ row matrices, and then a corresponding column matrix and row matrix are sent to one computation apparatus for computation. For example, the first column matrix and the first row matrix are sent to a first computation unit, the second column matrix and the second row matrix are sent to a second computation unit, and the like. Therefore, splitting and computation can be implemented, thereby implementing parallel computation and increasing a computation speed.

Figure 3:
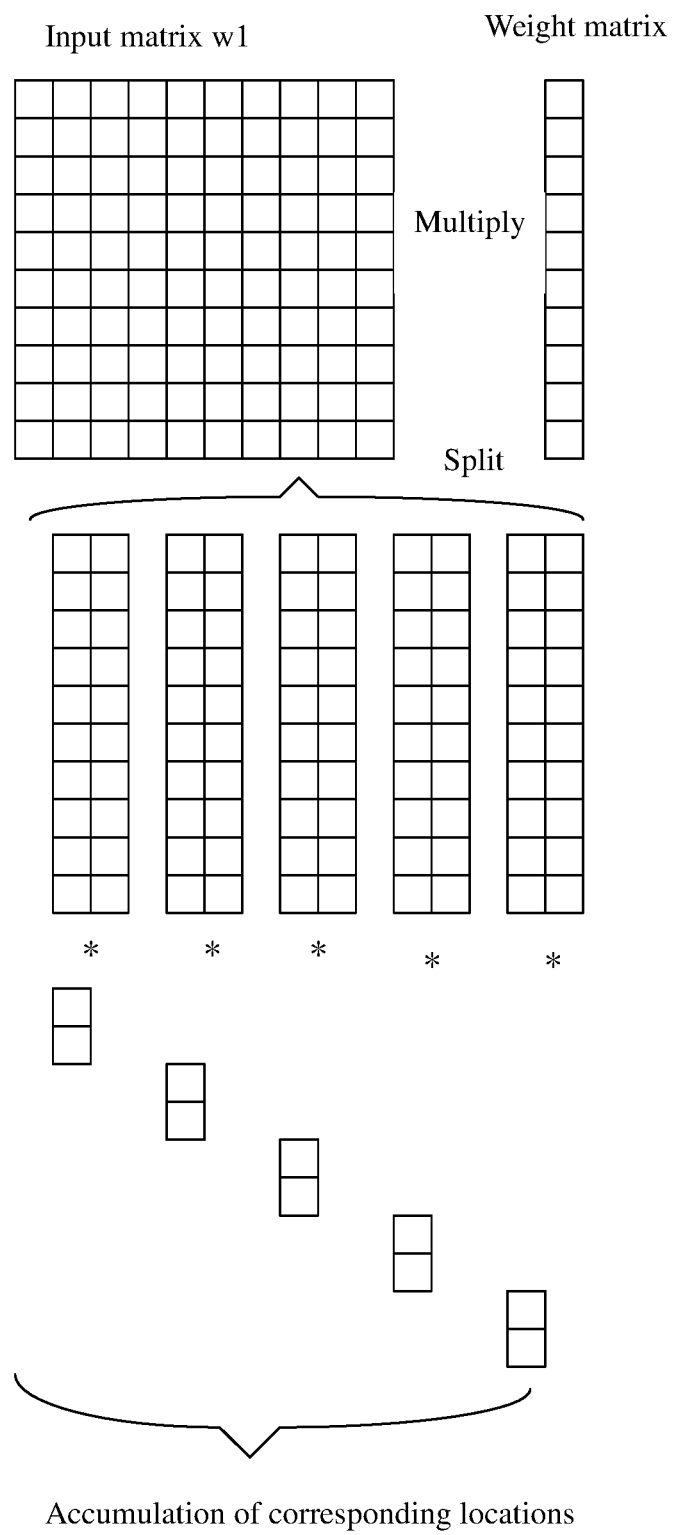
FIG. 3 is a schematic diagram of splitting and computation between an input matrix and a weight matrix according to an embodiment of the present application.

With reference to FIG. 3, an actual example is provided below. For ease of description, the input matrix w1 is a 10*10 matrix and the weight matrix is a 10*1 matrix.

If $\alpha$ is 5, then an input matrix w1 is split into five 2*10 column matrices based on columns, the 10*1 matrix is split into five 2*1 matrices, and the first 2*10 column matrix and 2*1 matrix are allocated to a first computation unit. Similarly, the others are respectively allocated to other four computation units for computation, so that five result matrices can be obtained, and values of locations corresponding to the five result matrices are added to obtain an output result of the input matrix w1 and the weight matrix.

In the technical solutions provided in this application, parallel computation on input data and weight data is implemented by using a splitting and parallel computation method, so that a computation speed is increased. In addition, a relatively low requirement is imposed on memories of multiple computation units, and a reason is as follows: A data amount of split data decreases, and a relative memory is relative small. The computation unit may be specifically a combination of a summator and a multiplier.

Figure 4:
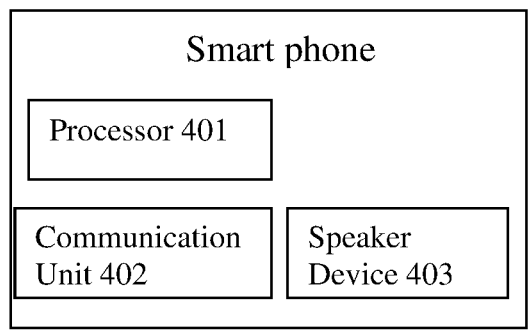
FIG. 4 is a schematic structural diagram of a smart phone according to an embodiment of the present application.

Referring to FIG. 4, FIG. 4 provides a smart phone. The smart phone includes a processor 401, a communication unit 402, and a speaker device 403 (a louder speaker or a telephone receiver).

The communication unit is configured to receive a calling request sent by a terminal, connect the calling request, establish a calling connection, and receive first voice information transmitted through the calling connection.

The processor is configured to: when the first voice information is identified and is determined as a non-specified language, translate the first voice information into second voice information of a specified language, and control the speaker device to play the second voice information.

Preferably, the calling connection is a 2G, 4G or 5G calling connection.

Preferably, the processor is specifically configured to extract a number of the terminal of the first voice information, determine a first nationality of the number, and if the first nationality does not belong to a nationality of the specified language, determine the first voice information as the non-specified language.

Preferably, the processor is specifically configured to generate an input matrix w by using the first voice information, use the input matrix w as input data, input the input data to a weight matrix p of a neural network model for computation to obtain a forward operation result, and determine, based on the forward operation result, whether the first voice information is the specified language.

An embodiment of the present application further provides a computer storage medium. The computer storage medium stores a computer program used for electronic data exchange, and the computer program enables a computer to perform some or all steps of any global simultaneous interpretation method in the method embodiment.

An embodiment of the present application further provides a computer program product. The computer program product includes a non-transitory computer readable storage medium storing a computer program. The computer program may be operated to enable a computer to perform some or all steps of any global simultaneous interpretation method in the method embodiment.

It should be noted that, to make the description brief, the foregoing method embodiments are expressed as a series of actions. However, a person skilled in the art should appreciate that the present application is not limited to the described action sequence, because according to the present application, some steps may be performed in other sequences or performed simultaneously. In addition, a person skilled in the art should also appreciate that all the embodiments described in the specification are optional embodiments, and the related actions and modules are not necessarily mandatory to the present application.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software program unit.

When the integrated unit is implemented in the form of a software program unit and sold or used as an independent product, the integrated unit may be stored in a computer-readable memory. Based on such an understanding, the technical solutions of the present application essentially, or the part contributing to the prior art, or all or a part of the technical solutions may be implemented in the form of a software product. The software product is stored in a memory and includes several instructions for instructing a computer device (which may be a personal computer, a server, or a network device) to perform all or a part of the steps of the methods described in the embodiments of the present application. The foregoing memory includes: any medium that can store program code, such as a USB flash drive, a read-only memory (ROM, Read-Only Memory), a random access memory (RAM, Random Access Memory), a removable hard disk, a magnetic disk, or an optical disc.

A person of ordinary skill in the art may understand that all or some steps in the method in the embodiments may be completed by a program instructing related hardware. The program may be stored in a computer-readable memory. The memory may include a flash drive, a read-only memory (ROM for short), a random access memory (RAM for short), a magnetic disk, an optical disc, or the like.

The embodiments of the present application are described in detail above. A principle and an implementation of the present application are described in this specification by using a specific example. Descriptions of the foregoing embodiments are merely used to help understand the method in the present application and a core idea thereof. Meanwhile, a person of ordinary skill in the art makes modifications to specific implementations and the application scope based on the idea of the present application. To sum up, content of this specification should not be understood as a limitation to the present application.

What is claimed is:

1. A global simultaneous interpretation method comprising:
   receiving, by a smart phone, a calling request sent by a terminal, connecting the calling request, and establishing a calling connection;
   receiving, by the smart phone, a first voice information transmitted through the calling connection, and when the first voice information is identified and is determined as a non-specified language, translating the first voice information into a second voice information of a specified language; and
   playing, by the smart phone, the second voice information by using a speaker device;
   the non-specified language and the specified language are official languages of different countries;
   a process of identifying the first voice information and determining the first voice information as the non-specified language comprises:
   generating an input matrix w by using the first voice information, using the input matrix w as input data, inputting the input data to a weight matrix p of a neural network model for computation to obtain a forward operation result, and determining, based on the forward operation result, whether the first voice information is the specified language;
   a method of determining, based on the forward operation result, whether the first voice information is the specified language includes:
   if the forward operation result is a result matrix, determining x locations corresponding to x elements greater than a specified threshold in the result matrix, and if more than x/2 locations in the x locations correspond to the specified language, determining that the forward operation result is the specified language, or otherwise, determining that the forward operation result is the non-specified language.

2. The method of claim 1, wherein the calling connection is a 2G, 4G, or 5G calling connection.

3. The method of claim 1, wherein the process for identifying the first voice information and determining the first voice information as the non-specified language specifically comprises:
   extracting a number of the terminal of the first voice information, determining a first nationality of the number, and if the first nationality does not belong to a nationality of the specified language, determining the first voice information as the non-specified language.

4. A smart phone comprising a processor, a communication unit, and a speaker device, wherein the communication unit is configured to receive a calling request sent by a terminal, connect the calling request, establish a calling connection, and receive first voice information transmitted through the calling connection; and the processor is configured to: when the first voice information is identified and determined as a non-specified language, translate the first voice information into a second voice information of a specified language, and control the speaker device to play the second voice information;

the non-specified language and the specified language are official languages of different countries;

the processor is further configured to generate an input matrix w by using the first voice information, use the input matrix w as input data, input the input data to a weight matrix p of a neural network model for computation to obtain a forward operation result, and determine whether the first voice information is the specified language based on the forward operation result;

a method of determining whether the first voice information is the specified language based on the forward operation result includes:

if the forward operation result is a result matrix, determining x locations corresponding to x elements greater than a specified threshold in the result matrix, and if more than x/2 locations in the x locations correspond to the specified language, determining that the forward operation result is the specified language, or otherwise, determining that the forward operation result is the non-specified language.

5. The smart phone of claim 4, wherein the calling connection is a 2G, 4G, or 5G calling connection.

6. The smart phone of claim 4, wherein the processor is configured to extract a number of the terminal of the first voice information, determine a first nationality of the number, and if the first nationality does not belong to a nationality of the specified language, determine the first voice information as the non-specified language.

7. A non-transitory computer readable storage medium, which is used to store a program used for electronic data exchange, and the program enables a terminal to perform the method of claim 1.

* * * * *